Sept. 11, 1951     E. F. PETERMEIER     2,567,346
FLOATING VEHICLE SEAT

Filed April 14, 1950

INVENTOR.
EDWIN F. PETERMEIER
BY
McMorrow, Berman + Davidson
ATTORNEYS

Patented Sept. 11, 1951

2,567,346

UNITED STATES PATENT OFFICE 2,567,346

FLOATING VEHICLE SEAT

Edwin F. Petermeier, Melrose, Minn.

Application April 14, 1950, Serial No. 155,944

5 Claims. (Cl. 155—9)

This invention relates to the construction of seats, and more particularly to those adapted for use on farm machinery, road equipment and rough riding vehicles.

The machinery used on farms and highways for their development or construction are usually in the form of tractors and earth-moving vehicles subject to travel over terrain that is rough and uneven. The seats on such equipment used by the drivers are conventionally made of metal and are hard riding. This is not only uncomfortable, but is a serious hazard to the drivers, resulting frequently in injuries to their bodies and organs that are irreparable. This invention relieves the situation by providing a floating suspension for the seat that takes up the jolts and vibrations, and cushions the effect on the operator driving the equipment. It consists of a post attached to the vehicle from which post a bracket extends and arcuately tilts on a hinge connection against a resilient resistance. The bracket has a flat spring arrangement connected to one end of it for augmenting the resiliency of the bracket and transmitting the reaction to a seat supported on the free end of the spring. This double reaction enables the user to ride comfortably in the seat. Further, the post is adapted to permit the rotative movement of the seat above an axis in a horizontal plane. The cushioning effect produced by this arrangement is arbitrarily termed "floating" to distinguish it from the conventional methods of using springs directly at the seat itself.

It is an object of this invention to provide a new and improved seat structure for rough riding vehicles that will avoid one or more of the disadvantages and limitations of the prior art.

Another object of the invention is to provide a new and improved seat structure that will have a cushioning arrangement capable of taking up the effects of rough terrain on a vehicle traveling over same.

A further object of the invention is to provide a new and improved seat structure for vehicles that will be mechanically strong and employ a plural system of cushioning to take up severe stresses due to rough terrain.

An additional object of the present invention is to provide a new and improved seat structure for tractors and the like that will be adjustably resistant to severe shocks and capable of being swung around to various positions.

Still another object of the invention is to provide a new and improved seat structure of the type described that will be simple in construction, economical to make and capable of withstanding hard usage.

Other objects will become apparent as the invention is more fully set forth.

For a clearer understanding of the invention and the objects thereof, reference is made to the accompanying drawings. These drawings portray a particular form of the invention by way of example, and are explained in the following description, while the claims emphasize the scope of the invention.

Referring to the drawings.

The same parts throughout the figures are designated by the same reference numerals.

Figure 1:
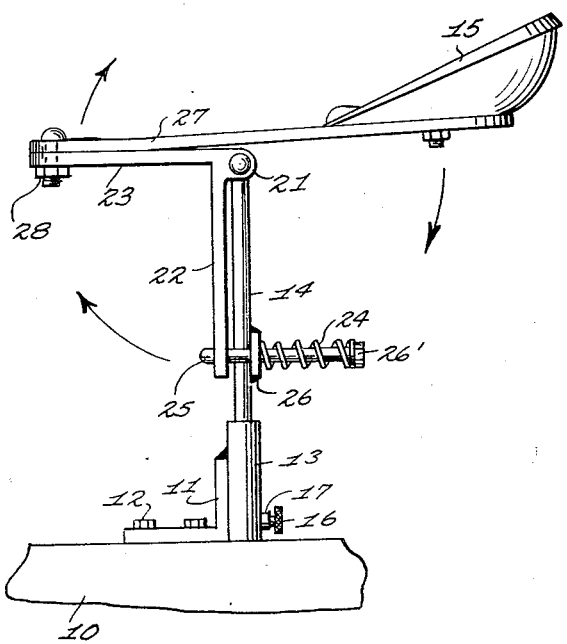
Figure 1 is a side elevation of a vehicle seat structure embodying this invention.
Figure 2:
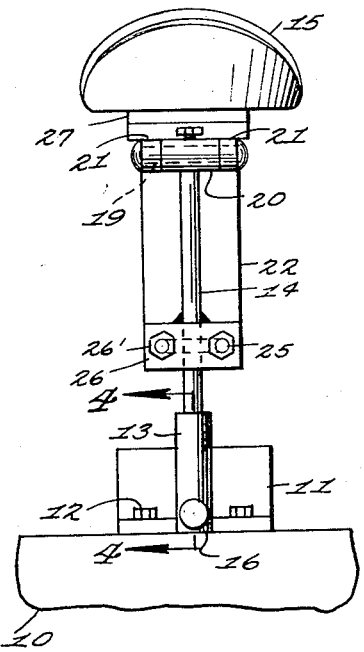
Figure 2 is a rear elevation of Figure 1.
Figure 3:
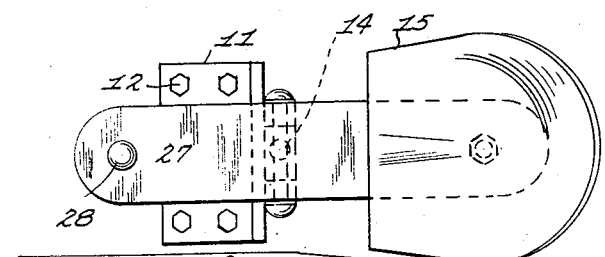
Figure 3 is a plan view of Figure 1.
Figure 4:
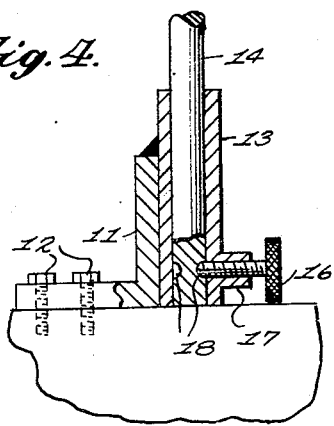
Figure 4 is an enlarged detail section of the base of the post used in this embodiment.
Figure 5:
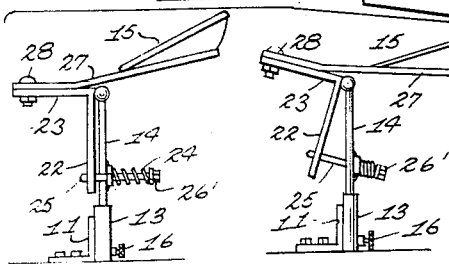
Figure 5 is a diagrammatic view of the structure to show its action.

The construction shown in the drawings is that of a seat structure usable with a tractor or the like. The dotted outline 10 arbitrarily indicates a portion of a tractor upon which the seat structure can be mounted. A base 11 of angular form has its lower side horizontally fastened to the tractor 10 by a set of bolts 12, as shown. The vertical side of the base has a short sleeve 13 welded to it and positioned parallel with this side and about the middle of the back face thereof. The sleeve is cylindrically hollowed out for a cylindrical post 14 disposed vertically in it and extended upwardly to form the main leg for the support of the seat 15 used with this structure. The post 14 fits in the sleeve 13 closely, and may be rotated in a horizontal plane on its axis therein. A set screw 16, operating in a boss 17, screws therein to project into a groove 18 near the bottom of the post and lock it in any position selected. The post 14 has a journal 20 mounted at right angles on its upper end to receive a shaft 19 horizontally disposed therein. The shaft 19 extends beyond this journal into journals 21 on both sides. The journals 21 are attached to the corner of a bracket which has a pair of arms 22, 23 bent at right angles to each other. The lower arm 22 is normally rested against the side of the post 14 and held there resiliently by a pair of coil springs 24 which respectively surround the legs of a U-bolt 25. A cross plate 26 is welded to the post 14 adjacent to the lower end of bracket arm 22 and is disposed on the side of the post opposite the arm 22. The two legs of the U-bolt 25 extend through apertures in the bracket arm 22 near the lower end of the latter and in the plate 26, and the bight or intermediate portion of the U-bolt overlies the portion of bracket arm 22 between the two bolt-receiving apertures therein. The springs 24 surround the U-bolt legs at the side of the plate 26 remote from bracket arm 22 and are restrained each at one end by the plate 26 and at its opposite end by a nut 26' on the corresponding leg of the U-bolt, so as to exert pressure on the nuts 26' and pull the arm 22 back toward the post. The journals 20, 21 with shaft 19 form a hinge connection on which the bracket can swing through an upwardly arcuate path.

The upper arm 23 is normally horizontal and has one end portion of an elongated flat spring member 27 fastened to it, near its end edge, by a bolt 28. The other end portion of the member 27 has the metal seat 15 secured to it. The member 27 is bent at a slight angle intermediate its length so as to resiliently support the seat on the bracket arm 33. Vertical movement of the seat depends not only on the resiliency of springs 24, but also on the resiliency of the material of which the member 27 is made, the resiliency of member 27 being involved when the seat is weighted or lightened to give it an up-and-down travel.

The seat 15 is cushioned by the primary resiliency of the member 27 first. Then, as the force is applied to the arm 23 of the bracket, the latter rotates through an upwardly arcuate path and in doing so brings the lower arm 22 with it. The latter tensions the springs 24 and augments the primary resiliency so that both together transmit their cushioning effect to the occupant in the seat. When the member 27 is forced down at the seat 15, it acts on the bolt 28 with the leverage due to its length. The area of contact adjacent the bolt is employed as a fulcrum, with the result that the material in the member is resiliently bent or stressed. The nuts 26' on the U-bolt 25 provide adjustment for the compression springs 24. The seat 15 may be swung around horizontally on the post 14 in the sleeve 13 and may be set in either direction on the member 27. It is preferred that the width of the arm 23 be less than that of the member 27 so that the chances of pinching the leg of the operator between them will be avoided.

The device has all the horizontal flexibility that is desirable, and its positioning in this manner is very easy because the length of the member 27 from the bolt 28 to the seat 15 gives considerable leverage to move it. The seat 15 is suspended on a floating spring and even when the limit of that is reached, it does not jolt, because the springs 24 are brought into action to augment the resiliency of the member 27. The construction is simple and enables all of its parts to be inspected and maintained readily. It can be quickly connected in place and when disassembled can be packed into a compact package.

While but one form of the invention is described herein, it is not desired to limit its construction to that form, as it is appreciated that other constructions could be used that would employ the same principles and come within the scope of the appended claims.

I claim:

1. Means for resiliently mounting a driver's seat on a mobile machine comprising a bracket mountable on the machine and providing a socket, a post mounted at its lower end in said socket to project upwardly from said bracket, an elongated flat spring extending across the top of said post and to opposite sides of the latter, means at the end of said spring for connecting a seat thereto, and means resiliently connecting the other end of said flat spring to said post.

2. Means for resiliently mounting a driver's seat on a mobile machine comprising a bracket mounting on the machine and providing a socket, a post mounted at its lower end in said socket to project upwardly from said bracket, an elongated flat spring extending across the top of said post and to opposite sides of the latter, means at one end of said spring for connecting a seat thereto, bracket means pivotally connecting said spring to the upper end of said post and extending from the other end of said flat spring to said post adjacent said socket-providing bracket, and resilient means connecting said bracket means to said post.

3. Means for resiliently mounting a driver's seat on a mobile machine comprising a bracket attachable to a machine for which the seat is provided, a post rotatably mounted at one end in said bracket to extend upwardly therefrom, an angle bracket disposed with its angle at the upper end of said post and one arm extending downwardly along one side of the post and its other arm extending substantially perpendicularly from said one side of said post at the upper end of the latter, means pivotally connecting said bracket at its angle to the upper end of said post, an elongated flat spring secured at one end to said other bracket arm at the distal end of the latter and extending over said other bracket arm and the upper end of said post to the side of said post remote from said angle bracket, a seat secured on said flat spring at the other end of the latter, and means resiliently connecting the lower end of said one bracket arm to said post to augment the seat-supporting resiliency of said flat spring.

4. Means for resiliently mounting a driver's seat on a mobile machine comprising a bracket attachable to a machine for which the seat is provided, a post rotatably mounted at one end in said bracket to extend upwardly therefrom, an angle bracket disposed with its angle at the upper end of said post and one arm extending downwardly along one side of the post and its other arm extending substantially perpendicularly from said one side of said post at the upper end of the latter, means pivotally connecting said bracket at its angle to the upper end of said post, an elongated flat spring secured at one end to said other bracket arm at the distal end of the latter and extending over said other bracket arm and the upper end of said post to the side of said post remote from said angle bracket, a seat secured on said flat spring at the other end of the latter, and means resiliently connecting the lower end of said one bracket arm to said post to augment the seat-supporting resiliency of said flat spring, said flat spring being bent intermediate its length so that it inclines upwardly from the upper end of said post to the seat-carrying end of said spring.

5. Means for resiliently mounting a driver's seat on a mobile machine comprising a bracket attachable to a machine for which the seat is provided, a post rotatably mounted at one end in said bracket to extend upwardly therefrom, an angle bracket disposed with its angle at the upper end of said post and one arm extending downwardly along one side of the post and its other arm extending substantially perpendicularly from said one side of said post at the upper end of the latter, means pivotally connecting said bracket at its angle to the upper end of said post, an elongated flat spring secured at one end to said other bracket arm at the distal end of the latter and extending over said other bracket arm and the upper end of said post to the side of said post remote from said angle bracket, a seat secured on said flat spring at the other end of the latter, and means resiliently connecting the lower end of said one bracket arm to said post to augment the seat-supporting resiliency of said flat spring, said means resiliently connecting the lower end of said one bracket arm to said post comprising a plate secured on said post at the side of the latter remote from said one bracket arm, said plate having therein two apertures disposed one at each side of said post and said one bracket arm having therein two apertures registering respectively with the apertures in said plate, a U-bolt having its legs extending through registering apertures in said one bracket arm and said plate and its intermediate portion overlying the portion of said one bracket arm between the apertures therein, a compression spring surrounding each U-bolt leg and bearing at one end against the side of said plate remote from said one bracket arm, and a nut threaded onto the outer end of each U-bolt leg and bearing against the adjacent end of the corresponding compression spring.

EDWIN F. PETERMEIER.

REFERENCES CITED

The following references are of record in the file of this patent:

FOREIGN PATENTS

| Number | Country | Date |
| --- | --- | --- |
| 48,362 | Denmark | Jan. 27, 1934 |
| 640,768 | Germany | Jan. 12, 1937 |